United States Patent [19]

Bergler

[11] Patent Number: 4,591,305
[45] Date of Patent: May 27, 1986

[54] MILLING FIXTURE WITH A MANUAL TOP SPINDLE MOLDER

[75] Inventor: Otto Bergler, Mühlacker-Lomersheim, Fed. Rep. of Germany

[73] Assignee: Black & Decker Overseas AG, Vaduz, Liechtenstein

[21] Appl. No.: 651,753

[22] Filed: Sep. 18, 1984

[30] Foreign Application Priority Data

Oct. 13, 1983 [DE] Fed. Rep. of Germany ....... 3337265

[51] Int. Cl.$^4$ .............................................. B23C 1/20
[52] U.S. Cl. ................... 409/175; 144/134 D
[58] Field of Search ............. 409/175, 135, 180, 181; 144/251 A, 134 A, 145 A, 137, 134 D

[56] References Cited

U.S. PATENT DOCUMENTS

| 1,586,574 | 6/1926 | Paden | 144/251 A |
| 1,598,498 | 8/1926 | Paden | 144/251 A |
| 2,771,104 | 11/1956 | Saxe | 144/114 |
| 3,838,722 | 10/1974 | Downing | 144/134 A X |
| 4,024,898 | 5/1977 | Bergler et al. | 144/134 D |

FOREIGN PATENT DOCUMENTS

| 843302 | 7/1952 | Fed. Rep. of Germany | 409/180 |
| 1004795 | 3/1957 | Fed. Rep. of Germany | 409/180 |
| 2506176 | 8/1975 | Fed. Rep. of Germany | 144/134 A |
| 2541259 | 4/1976 | Fed. Rep. of Germany | 144/134 A |
| 2421954 | 9/1983 | Fed. Rep. of Germany | 144/134 A |
| 8315192 | 9/1983 | Fed. Rep. of Germany | 144/134 A |

OTHER PUBLICATIONS

Article "Elektrischer Handfras-Apparat", Otto Brekle, (2 pages unnumbered).

Primary Examiner—William R. Briggs
Attorney, Agent, or Firm—Burns, Doane, Swecker & Mathis

[57] ABSTRACT

A milling fixture with a manual top spindle molder comprises a base plate upon which a drive assembly is adjustably mounted. The drive assembly includes a drive journal for driving a tool shaft. A bearing block is mounted on the drive assembly and includes a U-shaped member which carries a bearing which is aligned with said drive journal to receive the other end of the tool shaft. The base plate, together with the drive assembly and bearing block is pivotable relative to a workpiece guide on which the workpiece is supported. The bearing block includes a pendulum guide having a copying feeler for engaging the workpiece.

11 Claims, 3 Drawing Figures

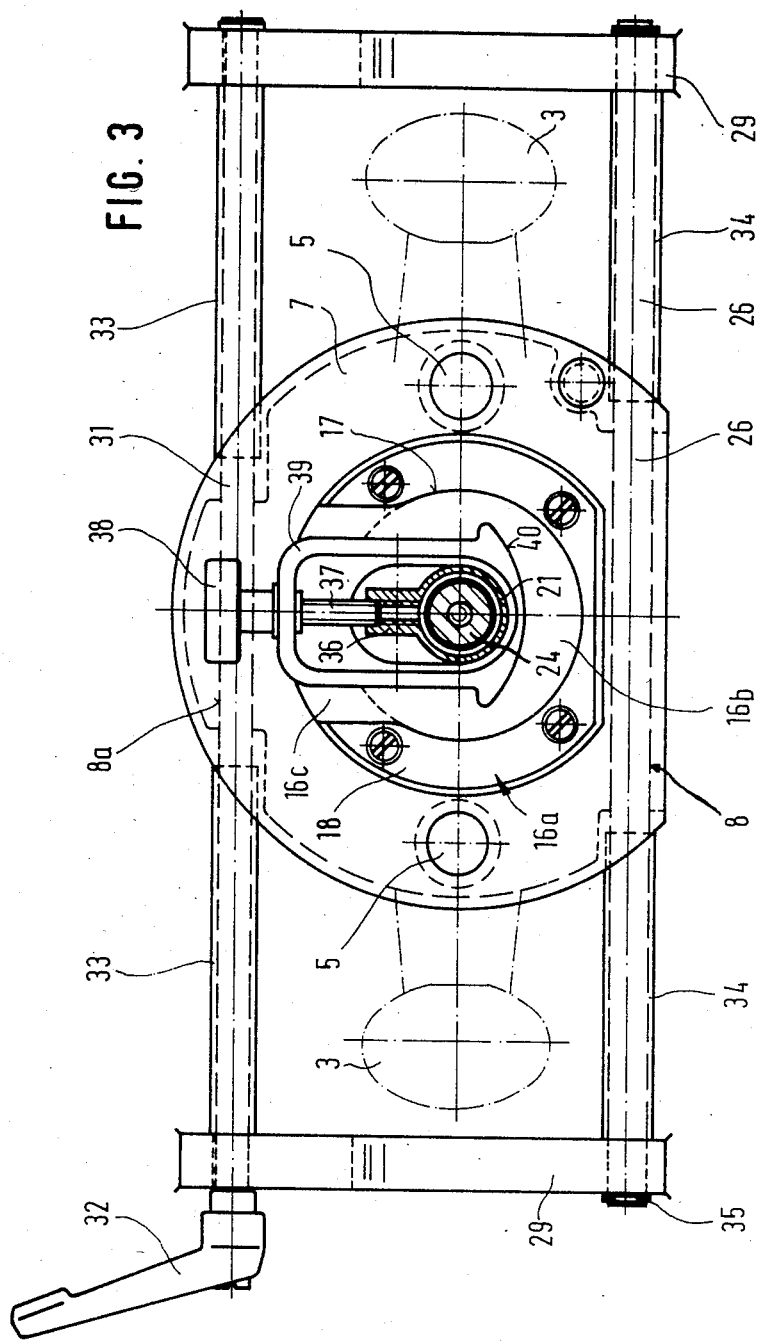

MILLING FIXTURE WITH A MANUAL TOP SPINDLE MOLDER

BACKGROUND AND OBJECTS OF THE INVENTION

The invention relates to a milling fixture for a manual top spindle molder. Milling fixtures are known (De 24 21 05) in which a frame-like base plate is provided with parallel columns. A drive assembly is adjustable on the columns relative to the base plate. A drive journal protrudes from a frontal housing cover for a tool. The base plate may be mounted on the side facing away from the workpiece of a workpiece guide, and provided with an orifice for the passage of the tool.

In the known configurations the manual top spindle molder may, together with its base plate, be screwed from below to a workpiece table. A milling cutter flyingly supported on the drive assembly may then be driven for the processing of workpieces. The adjustment of the cutter is effected by varying the distance between the drive assembly and the base plate, for which purpose an adjusting spindle supported on the workpiece table and the drive assembly may also be used. The applications of such known configurations are limited by the relatively short cutting length due to the flying support of the milling cutter.

It is an object of the present invention to further improve the potential applications of manual top spindle molders by rendering the use of longer chip-forming tools possible.

SUMMARY OF THE INVENTION

In the present invention a bearing pillow block is mounted on the housing cover. The pillow block is equipped with a bearing assembly for receiving a tool with the configuration of a plane head or the like. By means of this arrangement, manual surface milling processes may be effected which heretofore have been possible with specially equipped planer machines only. It is possible with the new configuration, for example, to use profile plane heads, such as those described for instance in DE-GM 83 15 192, and also other cylindrical plane heads of a relatively large length for the processing of workpieces.

The novel milling mixture thus provides the advantage that the profiling of moldings, beams or the like, is possible with a very simple installation, which may be acquired and used not only by large shops, but also by do-it-yourselfers. It is advantageous and simple to design the bearing pillow block in the form of a U-shaped strap, one leg whereof is surrounding the drive journal of the drive assembly and is fastened in a centering seat on the housing cover, while the other leg holds the bearing assembly. The connecting web of this U-strap may also function as a protective shield for one side of the tool, so that this configuration offers the advantage that the side of the tool not used in processing is covered and protected, but with a very simple manner of the alignment of the bearing assembly with the drive assembly being provided. The protective strip may be adapted on its inner side to the circumference of the maximum possible workpiece diameter. It may surround the tool maximally to one-half of its circumference. It has been found to be convenient, however, to have the protective strap surround the tool to about one-third of its circumference.

The second bearing location in the U-shaped supporting strap may comprise simply a ball bearing with a hollow bearing journal, through which a floating shaft for the tool is inserted. The drive journal for the tool has a connecting journal for joining the floating shaft fixedly in rotation, so that the tool, e.g., a planer head, may be replaced without the release of the top spindle machine from the bottom side of the workpiece table or another guide.

The leg of the U-shaped strap fastened to the housing cover is advantageously in the form of a frame, so that between the drive journal and the inner edge of the leg of the strap space is left to exhaust the cooling air of the drive assembly. In this configuration the cooling air also serves to blow away chips from the area of the tool.

A further advantageous development of the invention involves joining the base plate of the top spindle molder by means of a pivot axle with a holder stationarily mounted on the workpiece table. The holder is further equipped with a pivoting segment to immobilize the pivoted position of the top spindle molder. This makes it possible additionally to set the plane head or the plane shaft, together with the entire top spindle assembly at an angle to the guide surface of the workpiece, so that shape cuttings of different types are possible and workpieces may be processed in a manner not poossible heretofore by simple means.

The pivoting assembly may be immobilized by means of a shaft parallel to the pivot axle, the floating shaft being equipped in a manner known in itself with clamping means for clamping to the pivoting segment.

It is advantageous to attach to the leg of the bearing pillow block equipped with the bearing location an adjustable pendulum gide with a copy stylus, which makes it possible to place workpieces at different angles in the area of the free end of the bearing pillow block. The pendulum guide may comprise a holder pivoting around a bearing sleeve mounted stationarily and concentrically with respect to the axis of the workpiece on the bearing pillow block for an adjusting screw and a frame-like slide adjustable by means of the adjusting screw relative to the bearing sleeve, with an abutting surface for the workpiece. The profiling of semicircular, round or bent workpieces is thus possible.

THE DRAWING

The objects and advantages of the invention will become apparent from the following detailed description of a preferred embodiment thereof, in connection with the accompanying drawings, in which like numerals designate like elements, and in which:

FIG. 3 shows a top view of the milling fixture of FIGS. 1 and 2 in the direction of the arrow III of FIG. 2, in a partial section.

DETAILED DESCRIPTION OF A PREFERRED EMBODIMENT OF THE INVENTION

Figure 1:
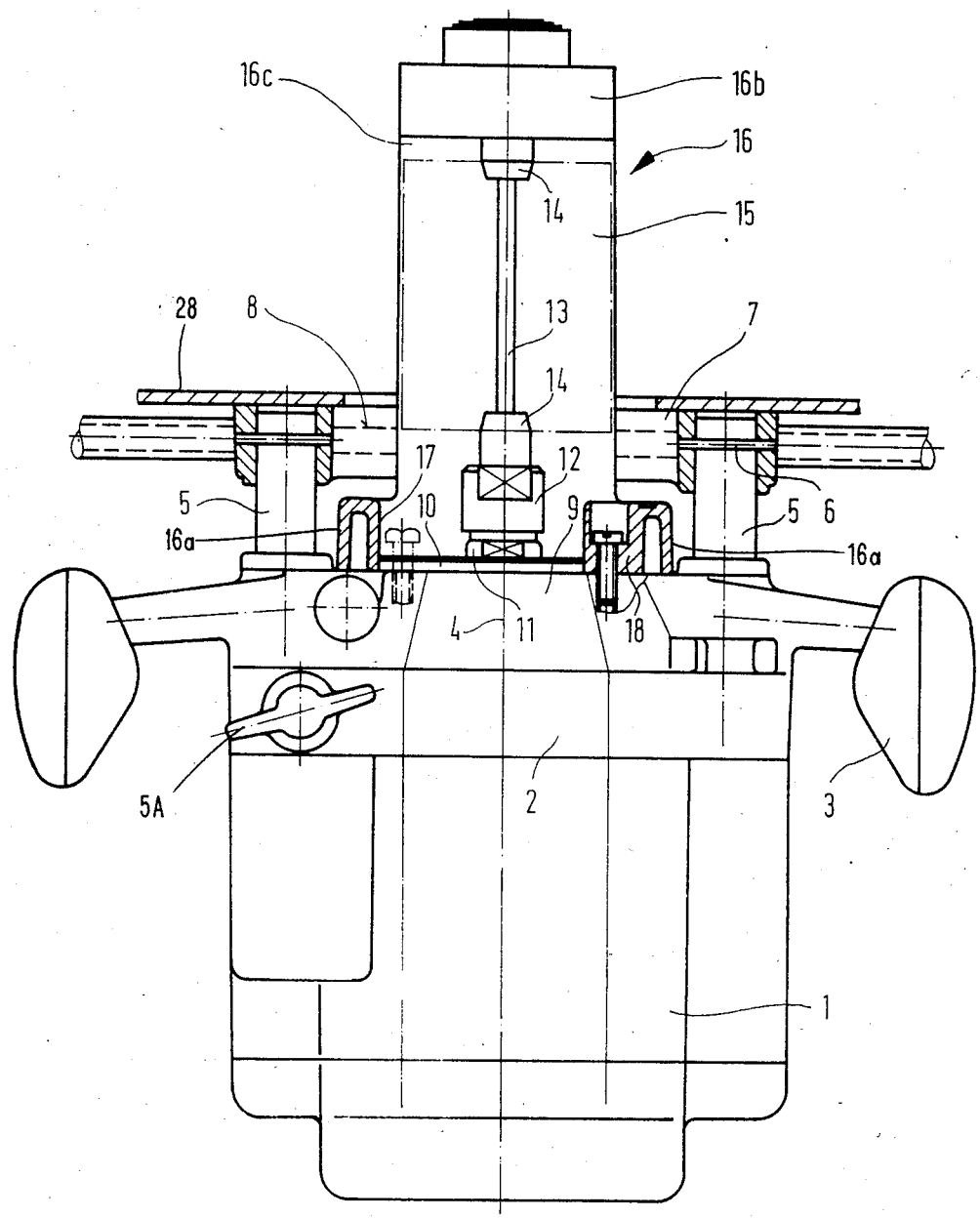
FIG. 1 shows a partially sectioned side elevational view of a milling fixture with a manual top spindle molder on the bottom side of a work table, but without a pivoting assembly.
Figure 2:
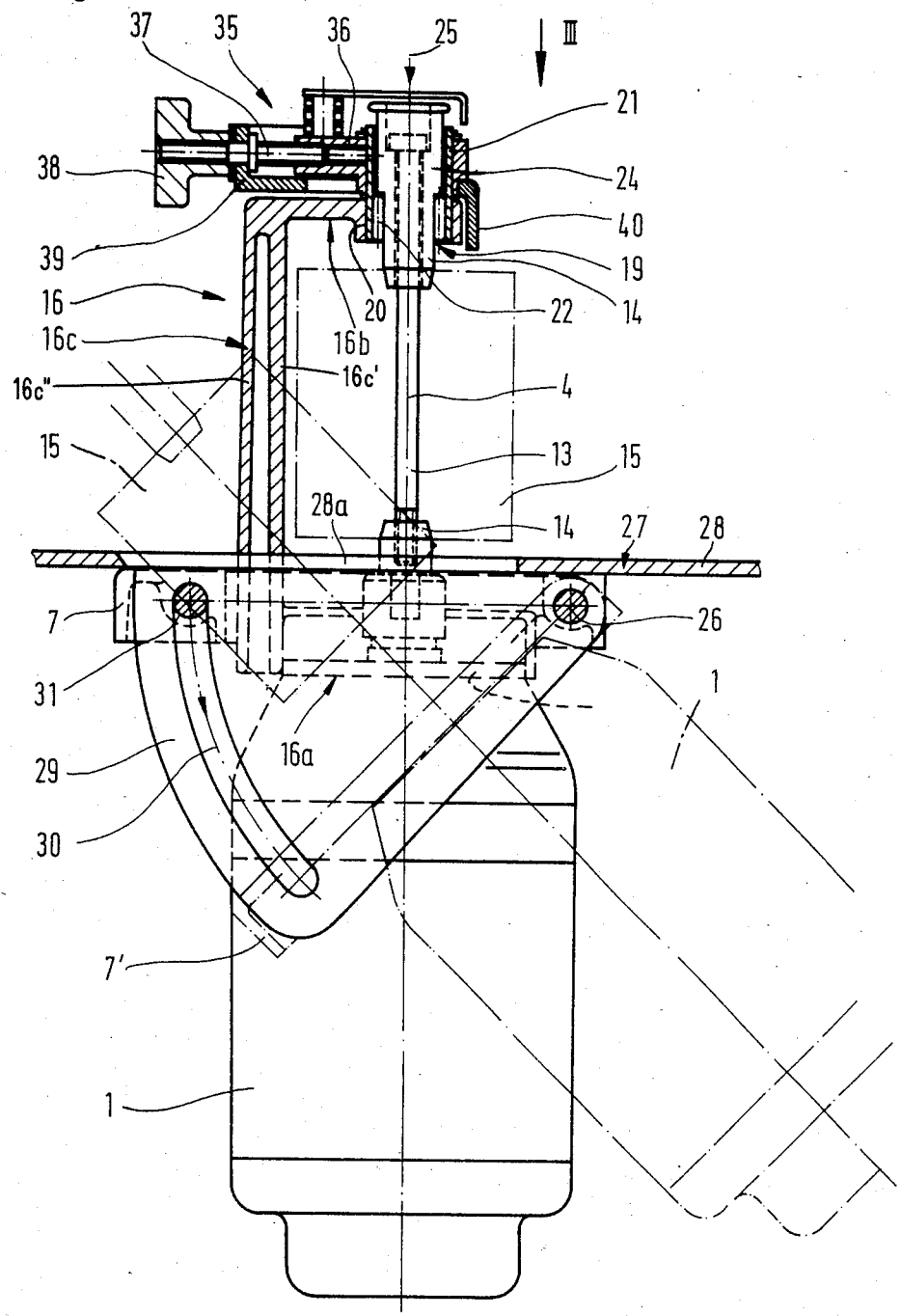
FIG. 2 depicts the milling fixture of FIG. 1, in a partial section and in a side elevation displaced ninety degrees from FIG. 1, with an angular displacement of the tool relative to the workpiece being depicted in broken lines.

In FIGS. 1 to 3 the drive assembly 1 of a known manual top spindle molder may be seen; it is supported displaceably upon columns 5 in the direction of the drive axle 4 of the drive assembly 1. The drive assembly 1 is disposed in a guide 2 having lateral manual handles 3, the guide being slidable upon the columns which are fixed by means of holding pins 6, in a frame-like base plate 7. Manual handles 5A on the guide 2 hold the guide in adjusted positions upon the columns. The base plate 7 is provided with two parallel boreholes 8, whereby, as explained hereinbelow, the base plate 7 is fastened to a stationary part, placed for example, on the bottom side of a work table.

The housing of the drive assembly 1 has a housing cover 9 on the upwardly directed side of the drive assembly 1, to which the manual handles 3 are also fastened. This housing cover 9 has, in a known manner, an orifice, through which a drive journal 11 for the tool extends. The journal 11 has a bearing and connecting journal 12 to be connected fixedly in rotation with a floating shaft 13. The shaft 13 is equipped at both ends with conical centering pieces 14 and intended for the fastening of a tool such as a cylindrical plane head 15, shown in broken lines. In order to bearingly support the floating shaft 13 not only on its end adjacent the drive journal 11, but also on the opposite end, a bearing pillow block 16 is mounted on the housing cover 9 of the drive assembly 1. The pillow block comprises a U-shaped supporting strap, one leg 16a of which surrounds the drive journal 11 of the drive assembly 1 and includes a circular frame 18 in which a recess 17 is disposed. The leg 16a also includes a circular centering holder 10 disposed within the recess 17. The holder 10 has a circular inner opening so that cooling air from the drive assembly can be exhausted through such opening and the recess 17. The leg 16a is arranged coaxially relative to the axle 4 of the drive assembly 1. The U-shaped strap 16 has a web part 16c extending through the base plate 7 to a second leg 16b of the strap 16. The leg 166 carries a bearing assembly 19, which is arrnged coaxially to the axle 4, but spaced axially from the drive journal 11 of the drive assembly 1. This bearing assembly 19 comprises a needle bearing 22 housed in a sleeve 21 which is located inside a bore hole 20 in the leg 16b. A hollow bearing journal 24 is held rotatingly in the needle bearing 22. The floating shaft 13 is inserted through the hollow journal in the direction of the arrow 25, after the tool has been positioned between the two conical parts 14. The web 16c extending in a manner approximately parallel to the axle 4 is provided, as see in FIG. 3, with an approximately cylindrical inner and outer wall 16C' and 16C", the diameter whereof is adapted to the maximum diameter of the tool 15. The web 16c therefore serves as a protective shield for the tool 15.

As seen clearly in FIGS. 2 and 3, the base plate 7 of the top spindle molder is connected rotatingly with a holder 27 by means of a rod 26 serving as a pivot axle. The holder 27 comprises a fastening plate 28 and two guide segmets 29 fixedly connected with the fastening plate 27. Both segments 29 are provided with a slide recess 30 extending in a circular arc around the axis of the pivot axle 26. A second shaft 31 carried by the plate plate 7 is guided in this slide recess, with such second shaft extending through a borehole 8a in the base plate 7 oriented parallel to the afore-mentioned borehole 8 in the base plate 7. On at least one of its ends the shaft 31 has threads, upon which a clamping lever 32 is threadedly mounted. Sleeves 33 and 34 extend between the segments 29 and are arranged parallel to each other and laterally on the plate 28, the sleeves serving to brace the pivot axle 26 and apply a clamping action through the second shaft 31. The pivot axle 26 is secured to the segments 29 by means of known axial fasteners, e.g., spring retaining rings. The second shaft 31 is also affixed axially on the pivot segment 29 on its side facing away from the clamping lever 32.

As seen in FIG. 2, it is possible by the placement of the base plate 7 relative to the holder 27 tilt the entire top spindle molder from its original position, so that is occupies a terminal position 1 (broken lines) wherein the tool 15 occupies an oblique position with respect to the top side of the plate 28. This plate 28, which comprises a recess 28a for the passage of the bearing pillow block 16 and the tool 15, may be mounted for example on the underside of a work table which is also equipped with a corresponding passage orifice. The tool 15 then protrudes upwardly past the surface of the work table. By thus inclining the tool, shape cuttings of different types are possible. The tool may be set relative to a workpiece resting on the surface of the work table (for example a beam to be profiled) by adjusting the top spindle machine on the columns 5 to the position desired, which may be effected in a known manner, for example, by means of an adjusting spindle connected with the plate 28 and the drive assembly 1. Following the setting of the relative position between the tool 15 and the workpiece, the position of the top spindle assembly on the columns may be secured in a known manner, so that the position of the tool relative to the workpiece is firmly established. The workpiece (for example a beam or a molding) may then be slid past the tool, wherein it is possible (as is known) to provide a top surface standing perpendicularly on the workpiece support surface on both sides of the bearing pillow block 16. It is obviously possible to operate without such an abutting surface, if, for example, curved workpieces are to be processed.

On the upper leg 16b of the bearing pillow block 16 a so-called pendulum guide 35 is provided, comprising a holder 36 for an adjusting screw 37, the holder being pivotable around the bearing sleeve 21. The adjusting screw is rotatable by means of a manual knob 38. The adjusting screw 37 is held rotatingly in a slide 39 which is provided on its end facing away from the manual knob 38 with an abutting surface 40 for the tool. The guide 35 enables workpieces to be placed at different angles. Hence, the profiling of semicircular, round, or bent workpieces is made possible.

The top spindle molder may be used further by virtue of the arrangement of the bearing pillow block 16 for elongated tools, such as plane heads, plane shafts or the like, which heretofore could not be utilized with drive assemblies of this type. In the novel milling fixture the flying support of tools has been replaced by bilateral bearing supports, thereby making possible the use of different tools. These tools may be mounted and replaced in a simple manner by the provision of a floating axle.

Although the present invention has been described in connection with a preferred embodiment thereof, it will be appreciated by those skilled in the art that additions, modifications, substitutions, and deletions nor specifically described may be made without departing from the spirit and scope of the invention as defined in the appended claims.

What is claimed is:

1. A milling fixture of the type having a manual top spindle and being securable to a workpiece guide, said fixture comprising:
   a base plate containing parallel columns,
   a drive assembly adjustably mounted on the columns, said drive assembly including:
      a housing part carrying means adjustably mounted on said columns,
      a tool drive shaft,
      a drive journal projecting from said housing part including means for receiving one end of said drive shaft, and
      a bearing block mounted on said housing part and carrying bearing means aligned coaxially with said drive journal and spaced axially therefrom to receive another end of said drive shaft, said bearing block comprising a U-shaped member including a pair of parallel legs interconnected by a web, one of said legs surrounding said drive journal and mounted to said housing part, said legs carrying said bearing means, said one leg including side walls spaced from said drive journal to form a space around said drive journal through which cooling air may be exhausted from said drive assembly.

2. A milling fixture in combination with a workpiece guide, said fixture being of the type having a manual top spindle and being securable to said workpiece guide, said fixture comprising:
   a base plate containing parallel columns,
   a drive assembly adjustably mounted on the columns, said drive assembly including
      a housing part carrying means adjustably mounted on said columns,
      a tool drive shaft,
      a drive journal projecting from said housing part including means for receiving one end of said drive shaft, and
      a bearing block mounted on said housing part and carrying bearing means aligned coaxially with said drive journal and spaced axially therefrom to receive another end of said drive shaft,
   said workpiece guide including a holder and guide segments secured to said holder,
   said base plate being pivotably connected to said holder for being disposed in adjusted positions relative to said holder, said base plate being guided by said guide segments during its pivotal movement about an axis of rotation.

3. A combination according to claim 2, wherein a shaft is mounted in said base plate at a location spaced from said drive journal to define a space through which cooling air can be exhausted from said drive assembly.

4. A milling fixture of the type having a manual top spindle and being securable to a workpiece guide, said fixture comprising:
   a base plate containing parallel columns,
   a drive assembly adjustably mounted on the columns, said drive assembly including
      a housing part carrying means adjustably mounted on said columns,
      a tool drive shaft,
      a drive journal projecting from said housing part including means for receiving one end of said drive shaft, and
      a bearing block mounted on said housing part and carrying bearing means aligned coaxially with said drive journal and spaced axially therefrom to receive another end of said drive shaft, said bearing block comprising a U-shaped member including a pair of parallel legs interconnected by a web, one of said legs surrounding said drive journal and mounted to said housing part, the other of said legs carrying said bearing means, said other leg carrying an adjustable pendulum guide having a copying feeler,
   said pendulum guide comprising a bearing sleeve arranged coaxially relative to said drive journal, a holder pivotable about said bearing sleeve, an adjusting screw threadedly mounted in said holder, and a slide movable relative to said bearing sleeve and operably connected to said adjusting screw to be slidingly displaced in response to rotation of said screw, said slide including a stop surface for contacting a workpiece.

5. A milling fixture of the type having a manual top spindle and being securable to a workpiece guide, said fixture comprising:
   a base plate containing parallel columns extending generally transversely relative to a plane defined by said base plate,
   a drive assembly adjustably mounted on the columns for movement relative to said plate in a direction transversely to said plane, said drive assembly including
      a housing part carrying a motor and means adjustably mounted on said columns,
      a tool drive shaft,
      a drive journal connected to said motor and projecting from said housing part generally parallel to said columns and including means for receiving one end of said drive shaft, and
      a bearing block mounted on said housing part and carrying bearing means aligned coaxially with an axis defined by said drive journal and spaced axially therefrom to receive another end of said drive shaft, said bearing block comprising U-shaped member including a pair of parallel legs interconnected by a web which extends through said plate in a direction generally parallel to said axis, said bearing block being movable relative to said plate parallel to said axis when said drive assembly is adjusted along said columns, one of said legs surrounding said drive journal and mounted to said housing part, the other of said legs carrying said bearing means.

6. A milling fixture according to claim 5, wherein said web being curved in shape and surrounding about one-half the circumference of said tool.

7. A milling fixture according to claim 5, wherein said one leg includes side walls spaced from said drive journal to form a space around said drive journal through which cooling air may be exhausted from said drive assembly.

8. A milling fixture according to claim 5 in combination with said workpiece guide which includes a holder, said base plate being pivotably connected to said holder for being disposed in adjusted positions relative to said holder, said base plate being guided by said guide segments during its pivotal movement about an axis of rotation.

9. A milling fixture according to claim 8, wherein a shaft is mounted in said base plate at a location spaced from said drive journal to define a space through which cooling air can be exhausted from said drive assembly.

10. A milling fixture according to claim 5, wherein said other leg carries an adjustable pendulum guide having a copying feeler.

11. A milling fixture according to claim 10, wherein said pendulum guide comprises a bearing sleeve arranged coaxially relative to said drive journal, a holder pivotable about said bearing sleeve, an adjusting screw threadedly mounted in said holder, a slide movable relative to said bearing sleeve and operably connected to said adjusting screw to be slidingly displaced in response to rotation of said screw, said slide including a top surface for contacting a workpiece.

* * * * *